(12) United States Patent
Ulrich (10) Patent No.: US 7,174,426 B2
(45) Date of Patent: Feb. 6, 2007

(54) INTERLEAVE PRE-CHECKING IN FRONT OF SHARED CACHES WITH PIPELINED ACCESS

(75) Inventor: Hanno Ulrich, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/896,500

(22) Filed: Jul. 22, 2004

(65) Prior Publication Data

US 2005/0027942 A1  Feb. 3, 2005

(30) Foreign Application Priority Data

Jul. 24, 2003  (EP) ................................ 03016843

(51) Int. Cl.
    *G06F 12/08* (2006.01)
(52) U.S. Cl. ...................... 711/130; 711/127; 711/129; 711/152; 711/150
(58) Field of Classification Search ...................... None
    See application file for complete search history.

(56) References Cited

U.S. PATENT DOCUMENTS 4,149,245 A  * 4/1979 Gannon et al. .............. 711/169

5,559,986 A  * 9/1996 Alpert et al. ................ 711/144
6,081,872 A  * 6/2000 Matick et al. ............... 711/122
6,154,814 A  * 11/2000 Uesugi ........................ 711/133

\* cited by examiner

*Primary Examiner*—Kevin Verbrugge
(74) *Attorney, Agent, or Firm*—Lynn L. Augspurger (57) ABSTRACT

The invention relates to a method and respective system for accessing a cache memory in a computer system, wherein the cache memory is split up in at least two segments, wherein the cache memory is accessed by a plurality of competing cache memory requests via a number of commonly used input registers, wherein a cache segment model is utilized for reflecting the cache use by said competing requests, wherein cache memory requests are processed by a processing pipe and wherein each cache-request, before entering the processing pipe, is checked whether the segments of the cache memory are available at the cycle it needs, wherein said memory comprises the steps of:

a) marking a segment model cell as busy with storing, if a store-request targeting to a cache segment corresponding to said model cell has received pipe access,
  b) blocking off from pipe access a fetch-request targeting to a segment model cell, which is marked busy with a store operation; and
  c) blocking off any store-request from pipe access, if at least one fetch request, which was blocked off from pipe access according to step b), is waiting for pipe access.

8 Claims, 10 Drawing Sheets

FIG.1 state of the art

FIG. 2a state of the art

FIG. 2b state of the art

FIG. 3a

FIG. 3b state of the art

FIG.4

B = 1 (Interleave busy bit):
SB = 1: Busy by Store
SB = 0: Busy by non-Store

INTERLEAVE PRE-CHECKING IN FRONT OF SHARED CACHES WITH PIPELINED ACCESS

BACKGROUND OF THE INVENTION

The present invention relates to cache memories in the area of computer technology. It relates in particular to a method and respective system for accessing a cache memory in a computer system, wherein the cache memory is accessed by a plurality of competing store and/or fetch requests via a number of commonly used input address registers, and wherein those store/fetch requests are processed by a processing pipe.

In such systems a cache segment is a part of a cache memory, which is separately addressable. This allows as many cache accesses to be active at a given cycle as there are segments available.

It is useful for most of computer applications to run in a fast processing computer system. The velocity of the processing of a computer system depends on different technical prerequisites, where clock frequency is an important one. Another crucial prerequisite is the structure of the storage hierarchy, which includes fast cache memories and the way data stored in the cache memories are accessed.

In current high performance computer systems, cache accesses are executed under the control of a processing pipe. The pipe is a sequence of processing steps, one per clock cycle, strung together one after another. In each step, in the following called cycle, certain operations are performed e.g. writing data into the cache memory (store) or reading data from the cache memory (fetch).

An interleave organization is a particularly efficient way of cache segmentation. That means a partitioning of the cache memory in columns orthogonal to the cache's line structure. Thus, each cache line touches all interleaves. Each interleave is separately addressable. A request, which is passing through a processing pipe, starts at one interleave and proceeds to the next interleave the next cycle until all data has been processed. For example a line fetch requests starts with the interleave holding the line segment, which is needed first, and proceeds to the next interleave until the complete line is read. If the cache's line has 128 bytes and the data to be transferred to and from the cache in segments of 16 bytes, then each interleave would store 16 bytes of a cache line beginning with interleave 0 and line-segment 0. With 8 interleaves, each cache line would cover all interleaves once, with only 4 interleaves twice.

Figure 1:
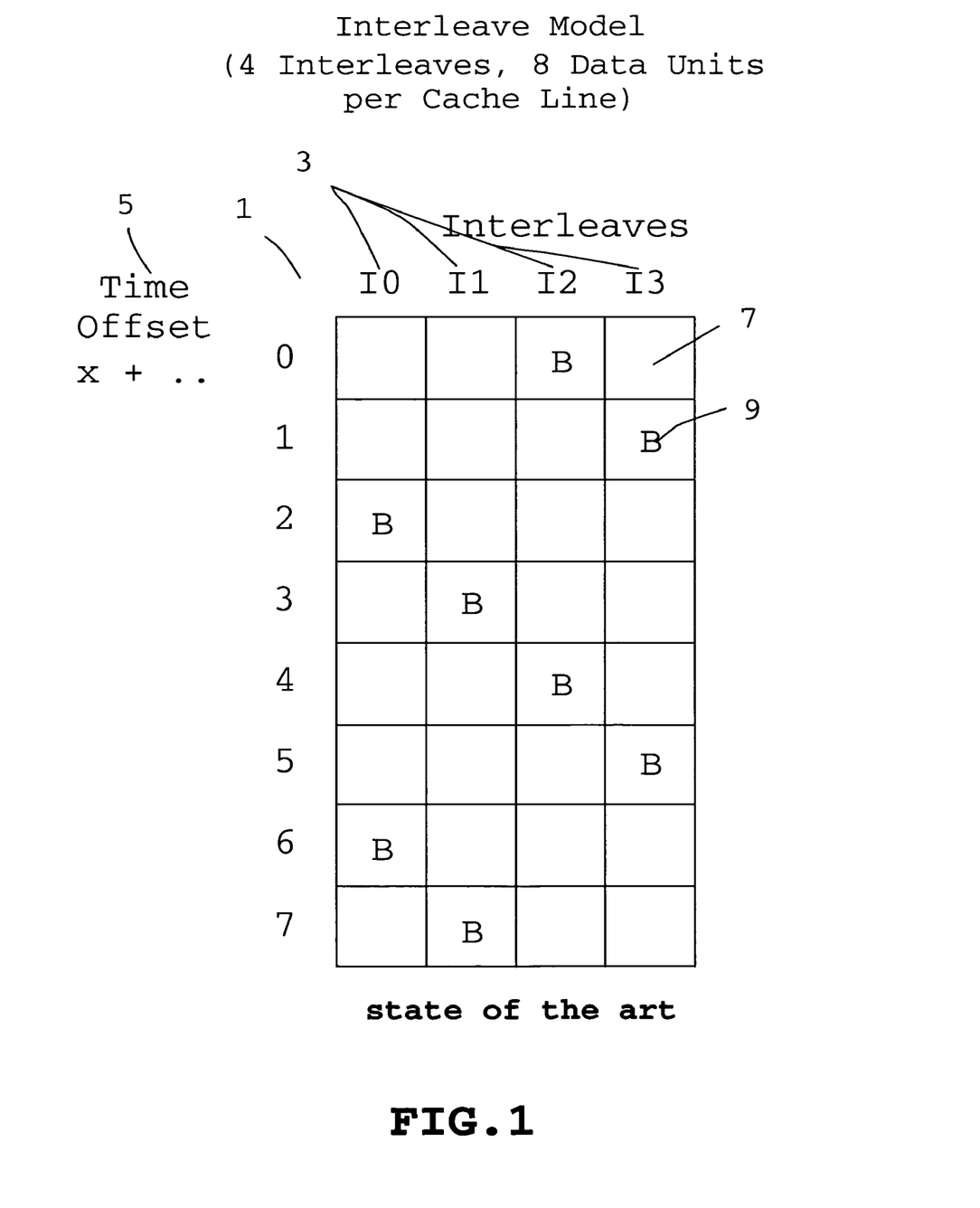
FIG. 1 is a schematic drawing of a prior art interleave model with 4 interleaves and 8 data units per cache line.

The predominant characteristic of a pipelined cache access is that each cache access takes place in a fixed pipe cycle and that each request entering that pipe cycle necessarily performs its cache access. This cache access scheme requires that cache usage is recorded in a table where each cell in the table represents a certain interleave at a certain cycle. In the following, this table is referred to as "interleave model". An example is shown in FIG. 1.

Each cache request passing through the processing pipe must have checked the interleave model before it is allowed to proceed to the actual cache access cycle. In case of an interleave conflict, the request is either rejected from the pipe or the pipe must stall until the request passes the interleave check. When the request passes the interleave check, it must reserve the interleaves for the cycles it will use, by putting corresponding reservation information into the interleave model (see FIG. 1). The update of the interleave model must be done early in the pipe cycle succeeding the checking cycle such that subsequent requests "see" the new state of the interleave model when they check the interleave model.

Access to the pipe facility is serialized via an arbitration scheme, which selects one request at a time. Arbitration happens in the first pipe cycle C0, which is therefore called priority cycle. For performance reasons, fetch requests typically have higher priority than store requests. Because stores to the cache first have to read data from the store buffer before actually writing them to the cache, stores typically occur in a later pipe cycle then fetches. The requests of lower priority, typically stores, access the cache in a later pipe cycle then the higher priority requests, typically fetches.

Current implementations of the environment described above check the interleave model within the pipe. The L2-cache pipeline of the IBM zSeries 900 for example does the checking at the end of the first pipe cycle, the priority cycle.

As a consequence, each time a request has highest priority, and its interleaves at the end of the priority cycle turn out to be unavailable, access to the second pipe cycle C1 will be denied. This results in pipe bubbles and hence in a non-optimized pipe usage. In particular, the low priority store requests are exposed to be delayed unnecessarily. This may cause the store buffers to fill up, which in turn has a severe impact on system performance.

Therefore, it would be desirable to check the interleave model up front before a request competes for pipe access. This was the approach in the first prior art IBM 9021 systems. There, requests first checked the interleave model, and only those requests which found all the interleaves they needed available were allowed to further compete for pipe access. This arbitration scheme, however, created another severe performance problem:

Since store requests, as explained before, access the cache in a later pipe cycle than fetches, a sequence of stores to one and the same cache interleave could block higher priority fetch requests for quite a while. Assume, for example, a tight programloop like a repeated counter update generates a sequence of stores to one and the same interleave, say i, one per cycle. Let d be the difference between the cache access cycles of a store and a fetch: d=b−a, where a fetch accesses the cache in pipe cycle a, and a store in pipe cycle b. In the example illustrated in FIG. 2 through 4, cycle a is C4, cycle b is C2, and d=2. The detailed description thereof is given later below.

When a fetch request targeting interleave i-d as its starting interleave hits into such a sequence, it will find the interleave i with the store, which came in d−k cycles ahead, where 0<k<d. Hence, a bunch of fetches, though they have higher priority, may have to wait until the store sequence completes, which has an immediate impact on system performance.

It is thus an object of the present invention to increase the performance of accessing a cache memory in a computer system, wherein the cache memory is split up in at least two segments and wherein the cache memory is accessed by a plurality of (competing) input address registers and cache memory requests that are processed by a processing pipe.

This objective of the invention is achieved by the features stated in the enclosed independent claims. Further advantageous arrangements and embodiments of the invention are set forth in the respective subclaims. Reference should now be made to the appended claims.

The present invention discloses a method and respective system for accessing a cache memory in a computer system, wherein the cache memory is split up in at least two segments, wherein the cache memory is accessed by a plurality of competing cache memory requests (fetch, store, etc.) via a number of commonly used input address registers, wherein a cache segment model is utilized for reflecting the cache use by said competing requests, wherein cache memory requests are processed by a processing pipe and wherein each cache-request, before entering the processing pipe, is checked whether the segments of the cache memory are available at the cycle it needs. Said method and system further comprises the following steps:

a) marking a segment model cell as busy with storing, if a store-request targeting to a cache segment corresponding to said model cell has received pipe access;

b) blocking off from pipe access a fetch-request targeting to a segment model cell, which is marked busy with a store operation; and c) blocking off any store-request from pipe access, if at least one fetch-request, which was blocked off from pipe access according to step b), is waiting for pipe access.

On the one hand this method enables stores, which are competing with fetches, to get cache access but on the other hand a fast cache access of a fetch, which was once rejected, is achieved. The benefit of this pre-pipe interleave model checking in comparison to the prior art in-pipe checking raises up to more than 10 percent when the store rate is large enough.

Further advantageous arrangements and embodiments of the invention are set forth in the respective dependent claims. Reference should now be made to the appended claims.

Advantageously, the present invention uses an interleave organization of the cache segmentation. Ideally, that is when request addresses are suitable arranged, a cache structured in interleaves provides for a cache access every new cycle of the processing-pipe. Thus the use of this way of segmentation nicely matches the concept of a processing-pipe and therefore shows excellent performance.

A further advantageous feature of the invention comprises the step of marking a segment model cell as busy with storing, by setting a store-busy-bit (SB). It is used to inform fetch requests whether a cache conflict was caused by a store or by another fetch request.

Another advantageous feature according to the invention comprises the step of marking a fetch-request, which is rejected according to step b) of the method as described above, by setting a store-reject-bit (SR). it is used to check whether any of the fetch requests waiting for cache access had been rejected before because of a conflicting store already being in progress.

It is also a preferred feature of the invention to set a store blocking-bit (BS) for blocking off a store-request from pipe access as soon as at least one featch-request, which was blocked off according to step b) of the method as described above, is waiting for pipe access. It is used to interrupt store sequences as soon as a higher priority fetch request has been blocked off from pipe access by a preceding store.

BRIEF DESCRIPTION OF THE DRAWINGS

The present invention is illustrated by way of example and is not limited by the shape of the figures of the drawings in which.

DETAILED DESCRIPTION

As the present invention comprises a plurality of features which can be best understood when "imported" easily into the prior art control flow, they are described also by setting them into contrast to prior art method control flow. This is why some prior art telling drawings will be exceptionally included in this section.

With general reference to the figures and with special reference now to FIG. 1, a prior art interleave model with four interleaves and eight data units per cache line is shown. The interleave model 1 is a matrix, which shows the reservation of interleaves 3 of a cache for time steps 5 corresponding to a pipe-cycle. Four columns represent the four interleaves 3 named I0, I1, I2 and I3 and eight rows represent the time steps 5 from present until seven time steps 5 in the future. As many rows are needed as there are data units per cache line, which are eight in the example shown in FIG. 1.

The cells 7 of the interleave model are marked with a bit (B="busy") 9, which is set from zero to one, if that interleave 3 at that time step 5 is reserved by an operation of a cache-request. In the example shown, the cache requests starts with interleave 2 which is why at the time offset x+0, interleave I2 is marked busy. In the next cycle, which is time offset x+1, the request busies the next interleave which is I3. With only four interleaves, the next interleave the request targets in the next cycle, is interleave 0. That way, a request's reservations in the interleave model proceed diagonally down from left to right.

Figure 2A:
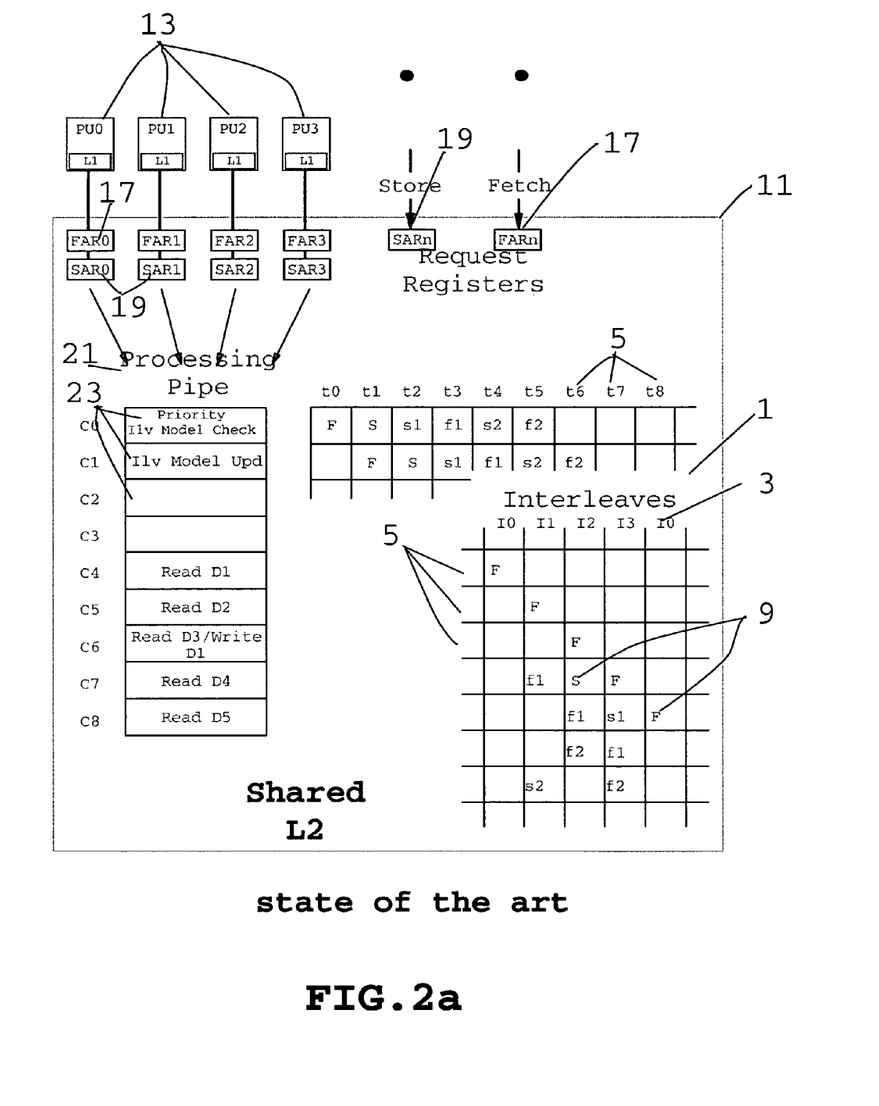
FIG. 2 is a schematic drawing comprising an interleave model of a cache controlled by a processing-pipe with prior art in-pipe checking where drawings a) shows a situation without an interleave conflict and drawing b) illustrates a situation with such a conflict.
Figure 2B:
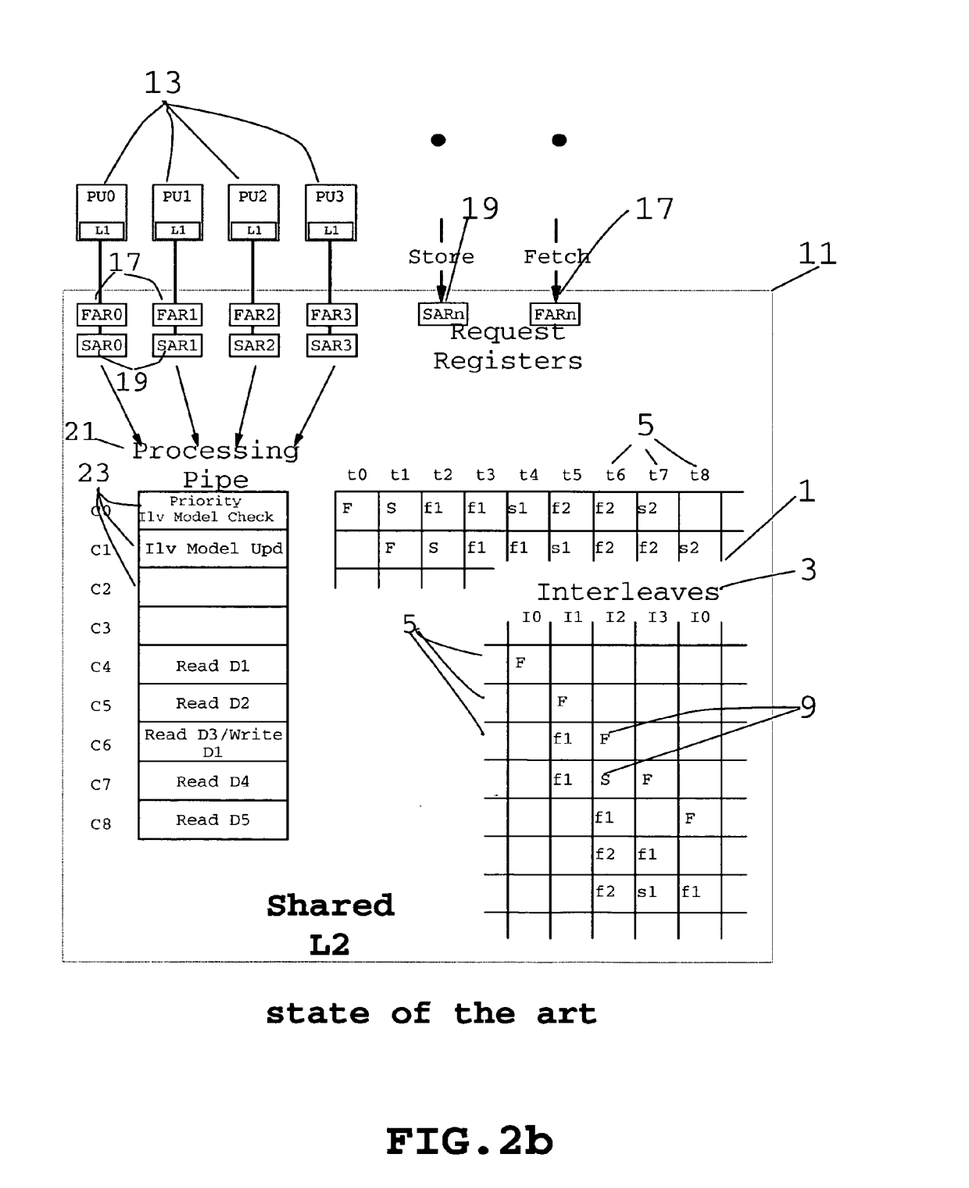

FIG. 2 is a schematic drawing comprising an interleave model of a cache processed by a processing-pipe with prior art in-pipe checking. Drawing a) shows a situation without an interleave conflict and drawing b) illustrates a situation with such a conflict.

The component of a multiprocessor system essential for the current invention is a shared cache 11 under the control of a processing pipe 21. As an example, FIG. 2 shows a level-2 cache (L2 cache) 11 shared by several processing units (PUs) 13 each equipped with a level-1 cache (L1-cache). Pus 13 issue fetch and store requests towards the L2 cache 11. The requests are stored in request registers 17, 19, ie, address registers, normally separately for fetches and stores, called FARs 17 and SARs 19. The request registers 17, 19 compete for L2-cache access.

The access itself is controlled by a non-stalling processing pipe 21 shown on the left side of the drawings: Pipe cycles 23 are numbered C0, C1, ... etc. C0, the first pipe cycle, is the priority cycle where the pipe arbiter selects the request to enter the pipe 21 next. In the sample illustration, reading from the L2-cache 11 starts in pipe cycle C4 and writing to the cache 11 starts in pipe cycle C6. The L2-cache interleaves 3 and the requests stepping 5 through the interleaves 3 are shown on the right side. For this example, four interleaves 3 are assumed. Store requests always write one data unit (e.g. 16 bytes) while fetch requests read several data units (e.g. one cache line of 8×16=128 bytes).

When a cache request has been granted pipe access, the interleave model 1 is updated at the beginning of pipe cycle C1. Since the update happens in C1, the first row in the interleave model 1 corresponds to a time offset of n−1 where Cn is the first pipe cycle 23 a cache access can occur. In the example shown, the first cache access occurs n C4 which is why the first row in the interleave model 1 corresponds to a time offset of three cycles from the current cycle, each. With each cycle 23, prior to an eventual update of the interleave model 1 by a new request in pipe cycle C1, the contents of the interleave model 1 are shifted upward by one row. All this is state of the art such as implemented in the L2 cache of IBM's zSeries 900.

It is common to all interleave model checking strategies that upon a successful model check the corresponding model update must be performed no more than one cycle later. The reason is that a cache request succeeding immediately must "see" the new state of the interleave model in the next cycle.

State-of-the-art in-pipe checking is done at the end of C0 when the request has gained pipe priority. FIG. 2a shows an example of conflict-free pipe competition. The sequence of requests arriving at the pipe is F-S-S-s1-f1 etc., where F and f stands for fetches and S and s for stores. Each request getting priority in C0 passes the interleave check at the end of C0 and enters C1.

FIG. 2b shows what happens when f1 arrives one cycle earlier i.e., together with s1: because fetches f1 have higher priority than stores s1, f1 gets priority over s1. But at the end of C0, the second interleave 3 addressed by f1 turns out to be busy 9 by the Store S ahead of f1. Hence, f1 will be rejected from the pipe 21 and has to retry the next cycle 23. Therefore, in the next cycle 23, pipe cycle C1 remains unused, although it could have been used by s1 without any conflict. The very same situation occurs three cycles 23 later when f2 fails because of s1 while s2 could have used the pipe 21 without any conflict. Eight cycles 23 are needed to process six cache accesses although no more than six cycles 23 are required.

Figure 3A:
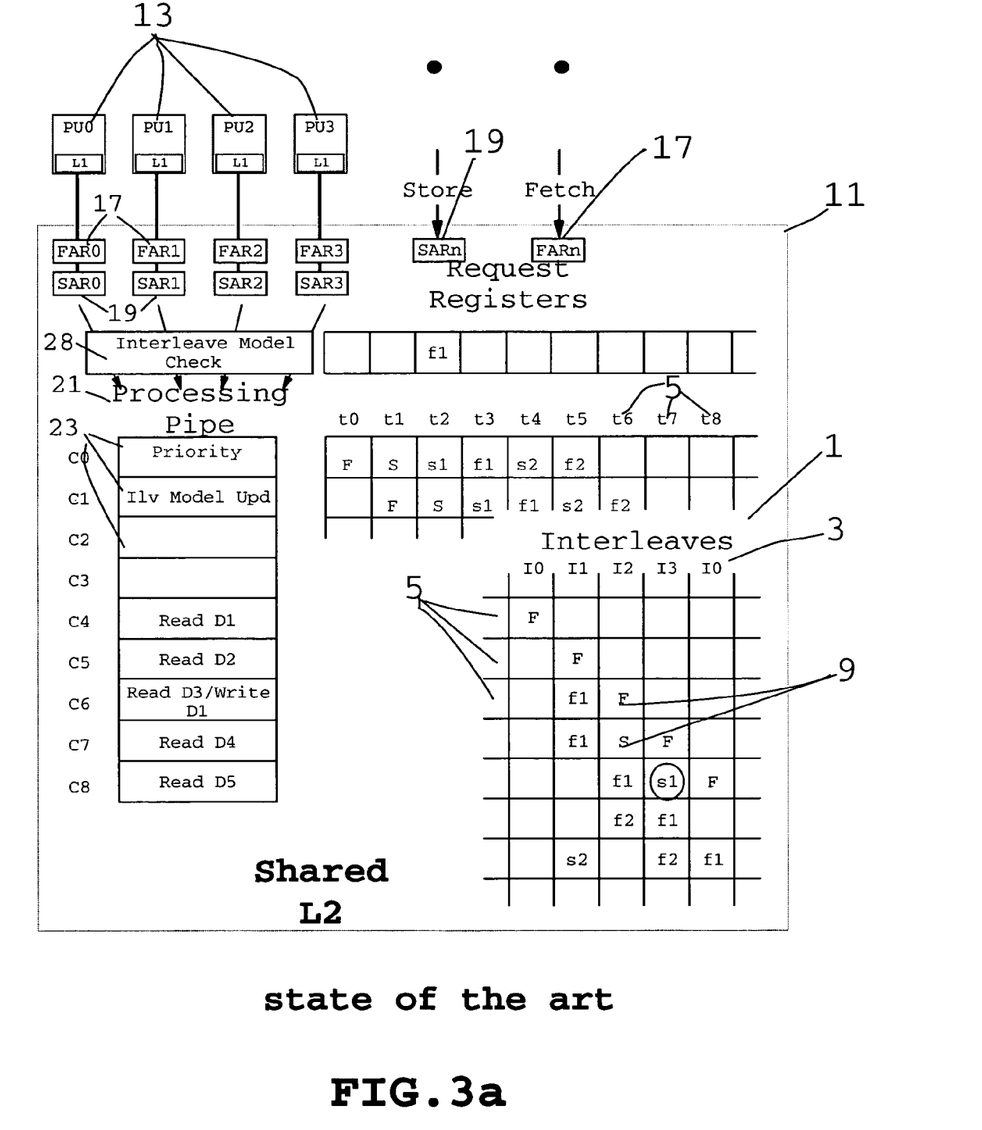
FIG. 3 is a schematic drawing comprising an interleave model of a cache controlled by a processing-pipe with prior art pre-pipe checking where drawing a) shows a situation without an interleave conflict and drawing b) illustrates a situation with such a conflict.
Figure 3B:
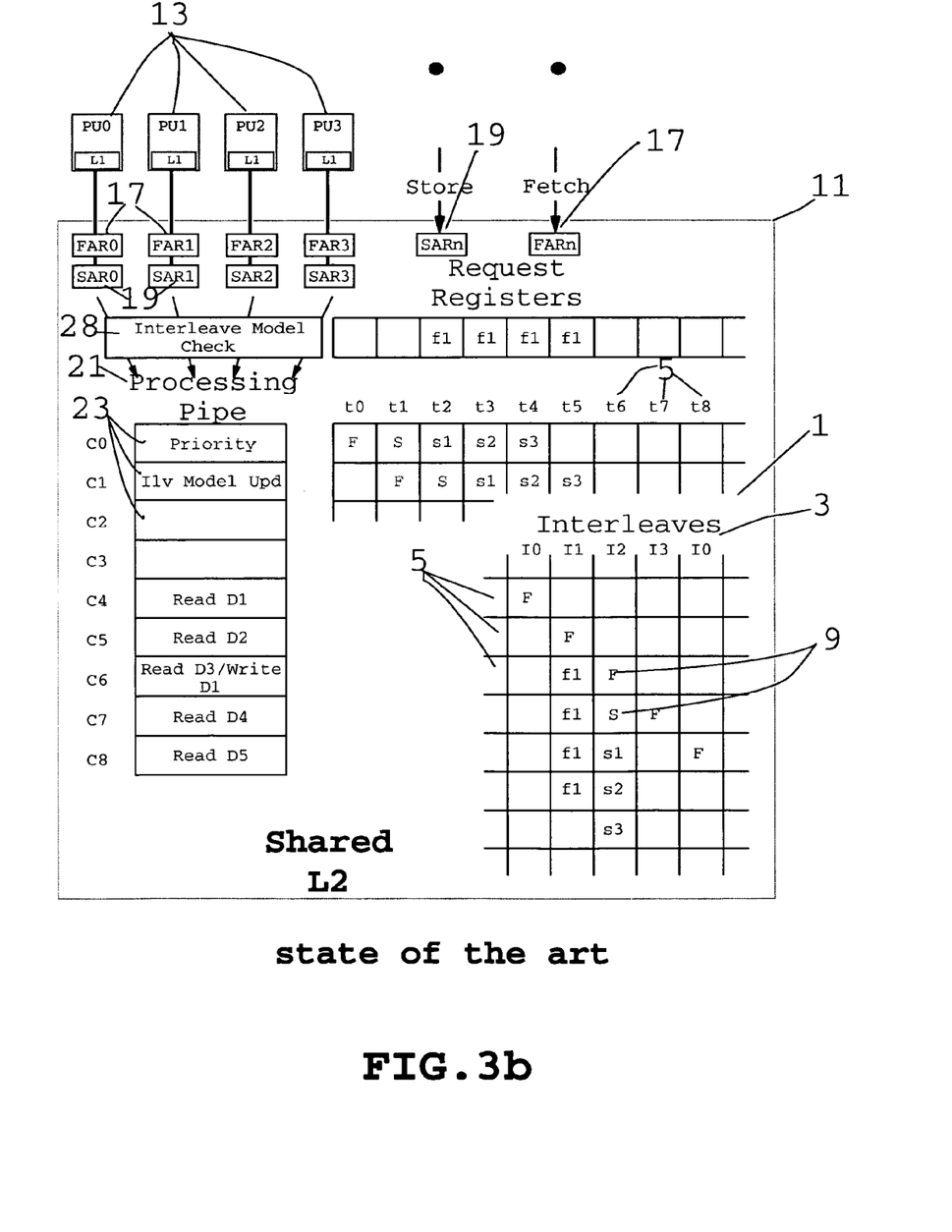
Figure 7:
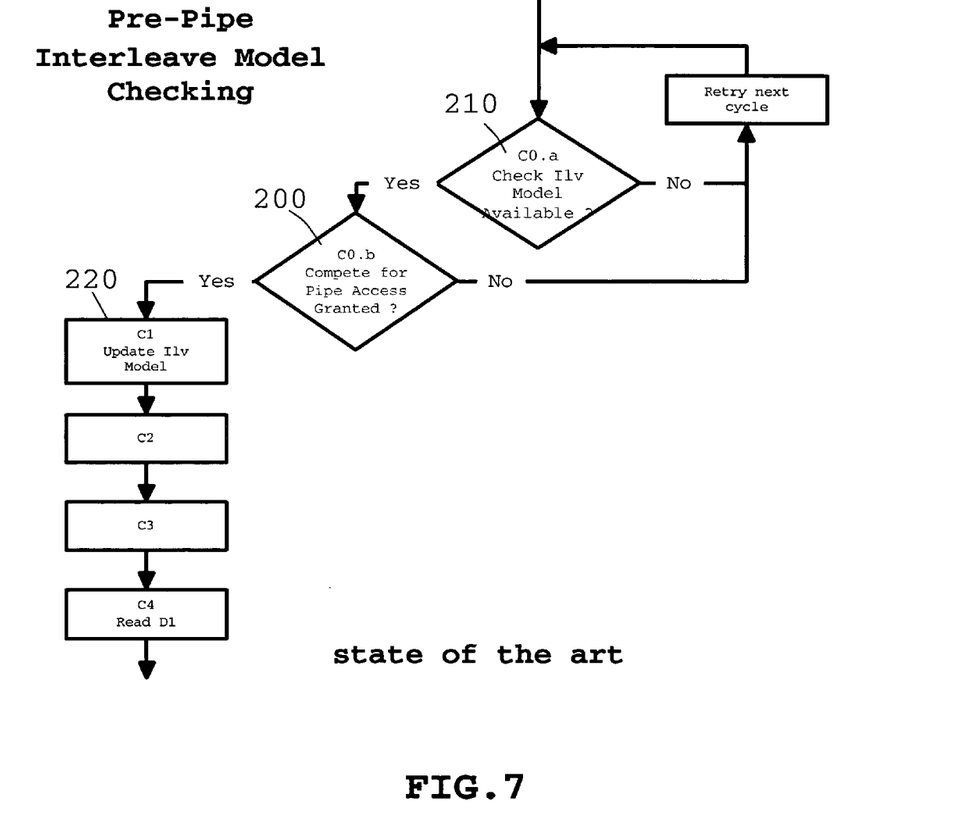
FIG. 7 is a schematic flow chart illustrating prior art pre-pipe interleave model checking.

FIG. 3 is a schematic drawing comprising an interleave model of a cache processed by a processing-pipe with prior art pre-pipe checking. The two drawings a) and b) show different situations. FIGS. 3a) and b) show the functioning of state-of-the-art pre-pipe checking and its shortcomings. As shown in the flowchart of FIG. 7, pre-pipe checking 28 is done in C0 before a request competes for pipe access and, as mentioned above, after a possible update of the interleave model 1 by a request ahead in C1. As illustrated in FIG. 3a, pre-pipe checking cures the pipe 21 usage problem described in FIG. 2b, because f1 would not compete for pipe access at time t2, since it sees its second interleave 3 busy by S. However, in case of a sequence of stores to one and the same interleave 3, such as shown in FIG. 3b, fetches are blocked for quite a while, thus jeopardizing the primary priority order where fetches range in front of stores.

Figure 4:
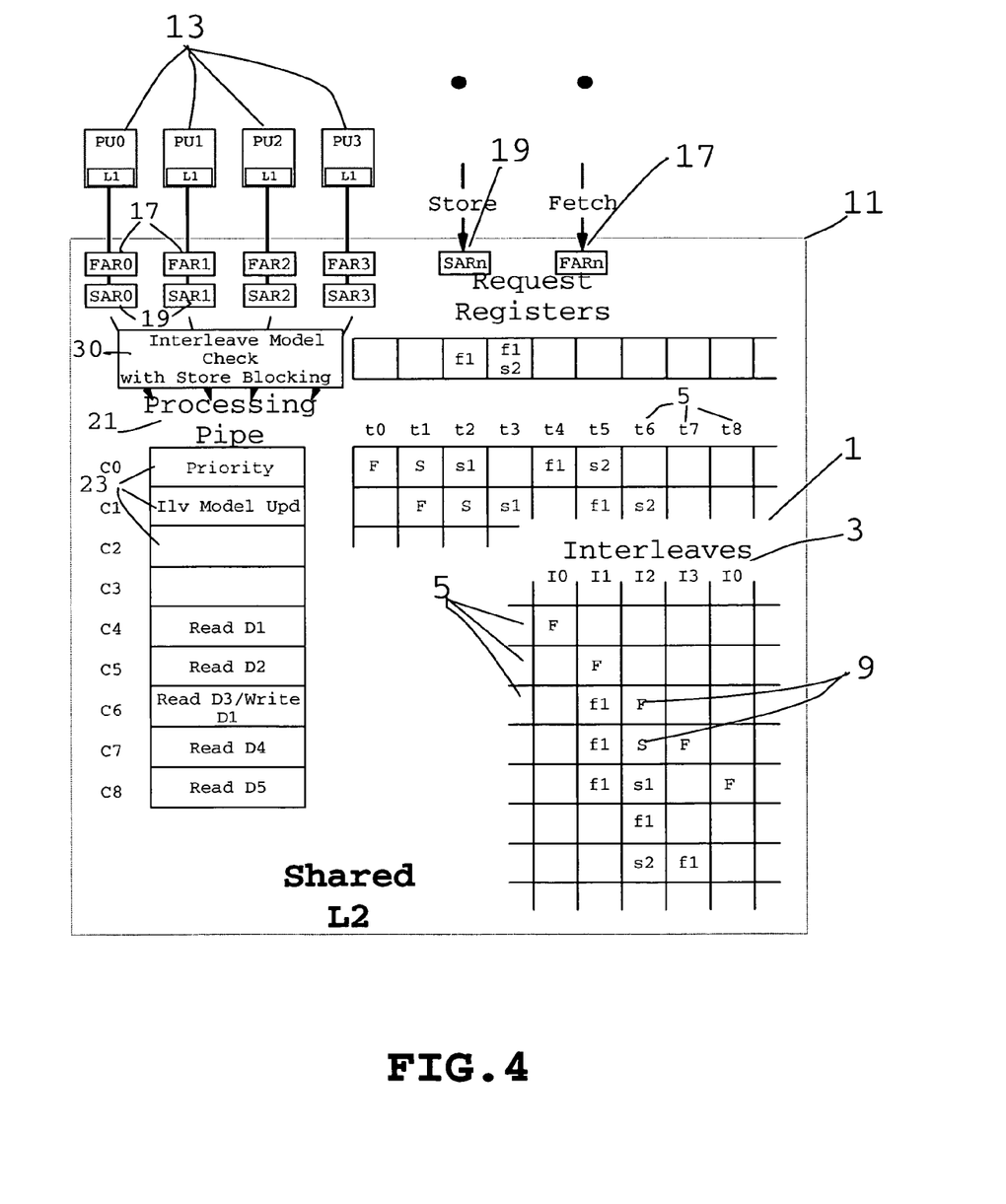
FIG. 4 is a schematic drawing comprising an interleave model of a cache processed by a processing-pipe with a pre-pipe interleave model checking according to the invention.

FIG. 4 is a schematic drawing similarly structured as seen before and comprising an interleave model of a cache processed by a processing-pipe with the pre-pipe interleave model checking with store blocking 30.

Figure 8:
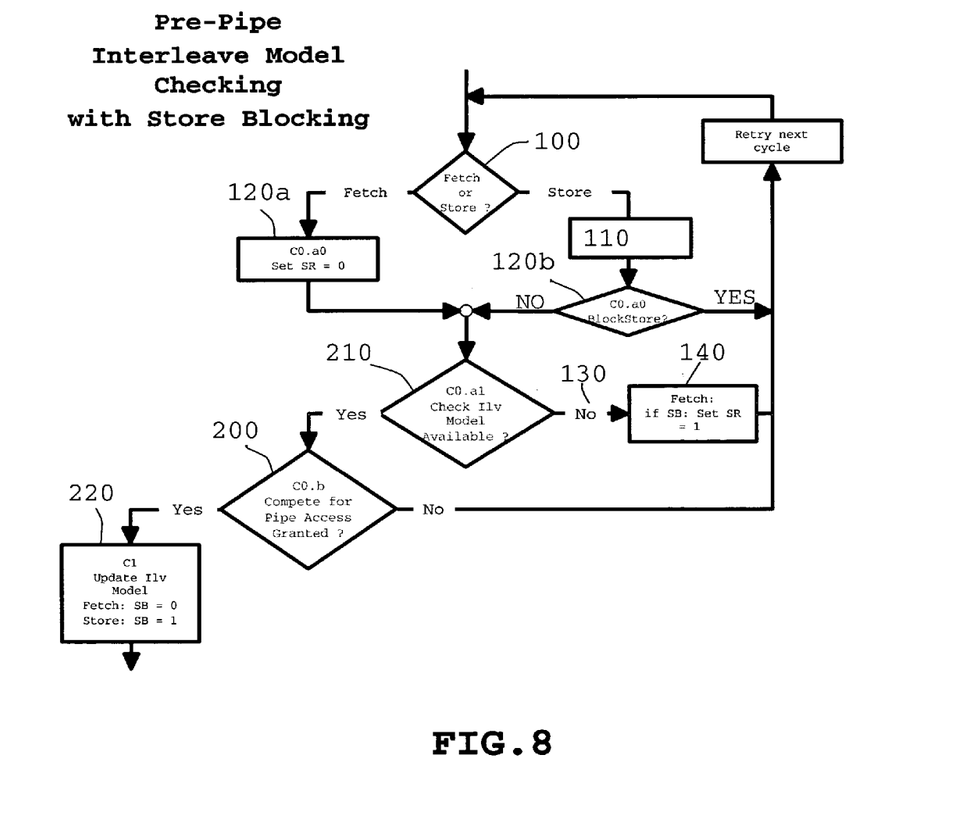
FIG. 8 is a schematic flow chart illustrating the pre-pipe interleave model checking according to the invention with store blocking.

A store request is blocked off from access to the pipe 21, if at least one fetch, which was rejected of pipe access due to a conflict in a needed segment model cell 7, which was marked affected 9 by a store, it waiting for pipe access. The schematic block illustration in FIG. 5 and the flowchart in FIG. 8 show in detail this pre-pipe interleave model check with store blocking 30.

The effect of pre-pipe checking with store blocking 30 is illustrated in FIGS. 3a and 4. Example 3a, where pre-pipe checking 28 cured the shortcoming of in-pipe checking, remains unchanged with the modification of pre-pipe checking 30.

The shortcoming of state-of-the-art pre-pipe checking 28 illustrated in FIG. 3b gets resolved by pre-pipe checking with store blocking 30 as shown in FIG. 4. Like in FIG. 3b, f1 fails to pass the interleave check at time t2 9because of store S) and at time t3 (because of store s1). Upon its first reject, however, f1 sets a mark in its address register 17, which in turn causes store blocking in t3. Therefore, s2 will be blocked in t3 and consequently, f1 passes the interleave model check in t4 successfully, thus interrupting the store sequence. Compared to prior art in-pipe checking with all its performance disadvantages, the fetch request is delayed by only one more cycle 23.

Figure 5:
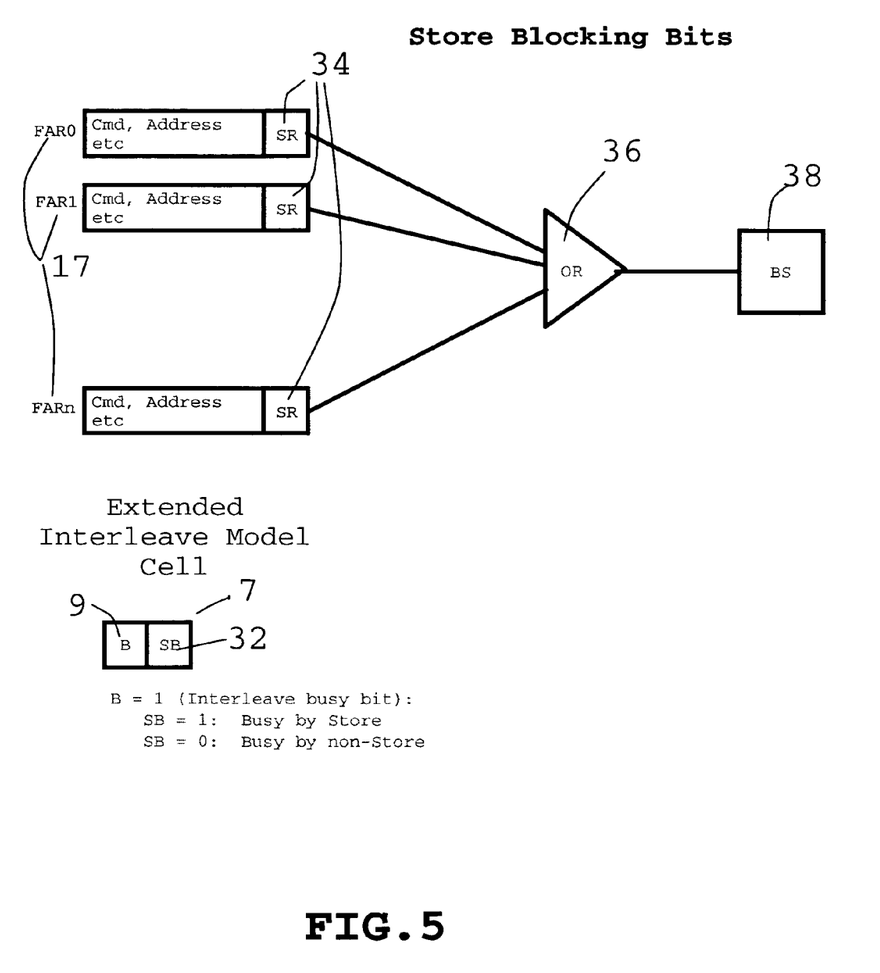
FIG. 5 is a schematic block illustration of a preferred embodiment of the store blocking circuit by the pre-pipe interleave model checking according to the invention.

FIG. 5 is a schematic block illustration of a preferred embodiment of the store blocking circuit including the pre-pipe interleave model checking.

As explained above, the interleave model 1 is an array of cells 7 with each cell 7 representing the usage of a certain interleave 3 at a certain time step 5 in size of a period of a pipe-cycle (see FIG. 1). With the present solution, each cell 7 is equipped with a busy-bit (B) 9 and an additional store-busy-bit (SB) 32, which will be set, if and only if a store request reserves that interleave for that pipe-cycle. Further, each of the fetch request registers (FARs) 17 is to be equipped with an additional store-reject-bit (SR) 34, which is reset to zero, when the register's fetch request starts a pipe access and which is set to one, when the request has been rejected due to an interleave conflict with at least one SB-bit 32 on.

Finally, the SR-bits 34 of all fetch requestors (FARs) 17 are to be OR'ed in a respective OR gate 36 to a block-store-bit (BS) signal 38. As the naming suggests, when set, the BS-filter prevents all outstanding stores from competing for pipe access. The ORing 36 of the SR-bits 34 must be done at cycle boundary, either at the end or at the very beginning of a cycle, so that the new state 38 of the BS-filter is available in the cycle following an update of the SR-bits 34.

Figure 6:
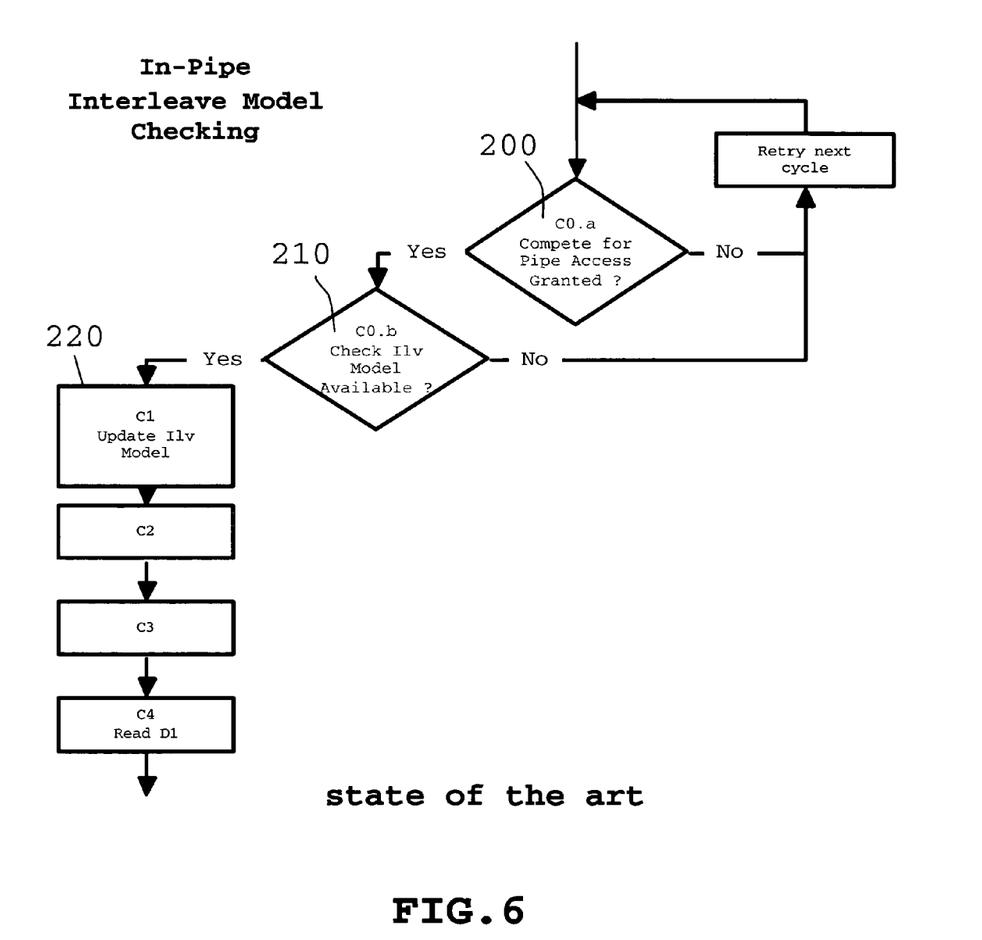
FIG. 6 is a schematic flow chart representation illustrating prior art in-pipe interleave model checking.

FIG. 6 is a schematic flow chart representation illustrating prior art in-pipe interleave model checking. There, at first in step 200 store—and fetch-requests to a cache memory compete for pipe access. The request with the highest priority gets access to the pipe and the other requests must retry pipe access in the next cycle. Fetches have higher priority than stores. Thus, if both a fetch and a store request are competing for pipe access at the same time, the fetch-request gets pipe access. In the next step 210, the request which has been selected for pipe access checks the interleave model whether all interleaves needed are available. If the needed interleaves are available, the request can continue passing the pipe in step 220. If not, the request is rejected and must retry pipe access in the next cycle. In this case, the request may have clocked another lower priority request whose needed interleaves are available.

FIG. 7 is a schematic flow chart illustrating prior art pre-pipe interleave model checking. At first, in step 210, each request checks the interleave model whether all interleaves needed are available. If all interleaves needed are available, the request competes for pipe access in step 200. If not, the request is rejected and must retry pipe access in the next cycle. In step 200, the request with the highest priority of all competing and not in step 210 rejected requests gets access to the pipe and continues passing the pipe in step 220. The other requests must re-queue for pipe access in the next cycle. Fetches have higher priority than stores. Thus, if both a fetch and a store request have successfully passed interleave checking in step 210 and are now competing for pipe access, the fetch request gets pipe access.

FIG. 8 is a schematic flow chart representation, illustrating the pre-pipe interleave model checking according to the invention with store blocking. The following description also references FIG. 5, which illustrates the store blocking.

Before competing for pipe access in step 200 a request must pass the following steps where fetch and store requests behave differently.

a) An incoming fetch request, in step 120a, first resets to zero its store reject bit (SR) 34 in the according fetch-register. Then, in step 210, the actual interleave model is checked. If there is a conflict in any of the interleaves which are needed for the fetch operation, the fetch is rejected in step 130 and does not compete for pipe access. The occupation of a cell by a store-operation is marked with a store-busy-bit (SB) 32 in the interleave model, which is set to "ONE" when a store has reserved that cell. When the fetch request fails the interleave check because of a conflict with a store operation, the SR bit in the fetch request's request register is set to ONE in step 140, and the fetch retries the entire pre-pipe interleave model checking again the next cycle.

Otherwise, that is if all interleaves the fetch request needs are available, the fetch proceeds to step 200 to compete for pipe access.

If pipe access is granted, the fetch request passes the processing pipe which starts in step 220 with updating the interleave model in the first cycle: The needed interleaves are marked busy in the respective cycles. The SB bit 32 is set to "ZERO" since the busying request is a fetch.

If pipe access is denied, the fetch goes back to the beginning of the pre-pipe checking and retries the entire check operation in the next cycle.

At cycle end, the block store function described with reference to FIG. 5 checks whether any of all fetch registers 17 SR bit 34 is set to "ONE". If so then the block store filter bit (BS) 38 is also set to ONE, and if not, BS is set to "ZERO". This new state of the BS filter becomes effective the next cycle.

b) An incoming store request, in step 120b, first checks whether this BS bit 38 is set. If the BS bit is set, the store request is rejected and retries the pre-pipe interleave model and BS checking again in the next cycle.

If the BS is not set, the control proceeds to step 210 where the actual interleave model is examined.

If not all of the interleaves, which are needed for the store operation, are available, the store request is rejected and retries the whole pre-pipe interleave model and BS checking again in the next cycle.

Otherwise, that is if all of the needed interleaves are available, the store-request competes for pipe access in the next step 200. If pipe access is granted, the store request passes the processing pipe which starts in step 220 with updating the interleave model in the first cycle. If pipe access is denied, the control returns to the beginning of the pre-pipe checking and retries the whole check operation in the next cycle.

The present invention can be applied advantageously in multi-processor systems, where multiple processors share the use of a common cache memory. Further, it can also be used in single processor systems which support multi-threading as long as a respective number of input address registers is available to support parallel cache accesses.

What is claimed is:

1. A method for accessing a cache memory in a computer system, wherein the cache memory is split up in at least two segments and is accessed by a plurality of competing requests via a number of commonly used input address registers, wherein a cache segment model is utilized for reflecting the cache use by said competing requests, wherein cache memory requests are processed by a processing pipe and wherein each cache-request, before entering the processing pipe, is checked whether the segments of the cache memory are available at the cycle they are needed, said method comprising the steps of:
   a) marking a segment model cell as busy with storing, when a store-request targeting to a cache segment corresponding to said model cell has received pipe access;
   b) blocking off from pipe access a fetch-request targeting to a segment model cell, which is marked busy with a store-operation; and
   c) blocking off a store-request from pipe access, if at least one fetch-request, which was blocked off from pipe access according to step b), is waiting for pipe access.

2. The method according to claim 1 wherein the cache-segmentation is organized in interleaves.

3. The method according to claim 1, wherein a segment model cell is marked as busy with storing by setting a store-busy-bit (SB).

4. The method according to claim 1, wherein a fetch-request, which is rejected according to step b) of claim 1, is marked by setting a store-reject-bit (SR).

5. The method according to claim 1, wherein a store blocking-bit (BS) is set for blocking off a store-request from pipe access, during at least one fetch-request, which was rejected according to step b) of claim 1, is waiting for pipe access.

6. A computer system with a cache memory under the control of a processing pipe comprising hardware logic means for performing the steps of a method according to claim 1.

7. The computer system according to claim 1, being arranged as a multi-processor computing system in which multiple processors share the use of a common cache memory, comprising hardware logic means implementing the steps of the method according to claim 1.

8. The computer system according to claim 1, being arranged as a single processor system supporting multi-threading, comprising a respective number of input address registers in order to support a respective number of parallel cache accesses, comprising hardware logic means implementing the steps of the method according to claim 1.

* * * * *